(12) United States Patent
Giorgalli

(10) Patent No.: US 9,087,358 B1
(45) Date of Patent: Jul. 21, 2015

(54) METHOD AND SYSTEM FOR PURCHASING PRODUCTS OR SERVICES APPEARING IN PLAYING MEDIA WITHOUT INTERRUPTING VIEWING

(71) Applicant: Vcomm Group, Inc., Mountain View, CA (US)

(72) Inventor: Ekaterini Giorgalli, Mountain View, CA (US)

(73) Assignee: VCOMM GROUP, INC., Mountain View, CA (US)

( * ) Notice: Subject to any disclaimer, the term of this patent is extended or adjusted under 35 U.S.C. 154(b) by 0 days.

(21) Appl. No.: 14/329,858

(22) Filed: Jul. 11, 2014

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0633* (2013.01); *G06Q 30/0241* (2013.01)

(58) Field of Classification Search
USPC ....................................................... 705/26.1
See application file for complete search history.

(56) References Cited

U.S. PATENT DOCUMENTS

| | | | |
|---|---|---|---|
| 6,131,086 A | 10/2000 | Walker et al. | |
| 2006/0020523 A1 | 1/2006 | Song | |
| 2006/0089843 A1* | 4/2006 | Flather | 705/1 |
| 2006/0136305 A1 | 6/2006 | Fitzsimmons et al. | |
| 2006/0212893 A1 | 9/2006 | Walker et al. | |
| 2006/0218571 A1 | 9/2006 | Walker et al. | |
| 2006/0225096 A1 | 10/2006 | Walker et al. | |
| 2007/0006267 A1 | 1/2007 | Walker et al. | |

OTHER PUBLICATIONS www.cinematique.com. © 2014 Cinematique LLC.

* cited by examiner

*Primary Examiner* — Mila Airapetian
(74) *Attorney, Agent, or Firm* — Wilson Sonsini Goodrich & Rosati

(57) ABSTRACT

Computer-implemented methods for simultaneously viewing a playing multimedia and shopping for a product currently appearing in it comprising: providing, by a computer, an interface for playing the multimedia; providing, by the computer, an interface for selecting the product appearing in the playing multimedia to place the product into a shopping cart without stopping or pausing the playing multimedia, provided that the product is not visually distinguished as selectable, the shopping cart appearing temporarily when the product is added without disturbing the playing multimedia, the selection of the product visually indicated by a graphic icon moving into the shopping cart; providing, by the computer, an interface for accessing the shopping cart at the end of the viewing period; and providing, by the computer, an interface for purchasing, renting, or saving the product or accessing information of the product in the shopping cart at the end of the viewing period.

28 Claims, 6 Drawing Sheets

METHOD AND SYSTEM FOR PURCHASING PRODUCTS OR SERVICES APPEARING IN PLAYING MEDIA WITHOUT INTERRUPTING VIEWING

BACKGROUND OF THE INVENTION

Media, particularly video media, such as movies, television shows, and music videos, attract large audiences to the products, services, events, and/or locations that appear in them. The audiences have a great tendency to become potential buyers of these products and services that appear in media.

SUMMARY OF THE INVENTION

Audiences are often attracted to products, services, events, and/or locations that appear in a movie, a television show, a live event, or similar multimedia. Most media are produced for their entertainment and artistic value and are not produced for the purpose of advertising or marketing products or services that appear in them. Moreover, existing media do not offer an integrated mechanism for allowing viewers to learn about or purchase the appearing products and/or services. While product placement is a form of advertising, it offers nothing to allow viewers to learn about or purchase the appearing products.

As a result, there is very limited information available for the viewing audience to acquire the products or services appearing in a multimedia. For example, currently, viewers seeing a product, such as a pair of sunglasses worn by a character in a movie, would have to conduct research, unassisted, to discover how to obtain the glasses for themselves. Currently, there is no shopping method or system that allows a viewer to directly purchase a piece of merchandise that appears in a playing multimedia. Furthermore, none of the currently available shopping methods or systems provides an efficient shopping experience during the viewing of a multimedia that does not interrupt the media or diminish its entertainment and/or artistic value. As a consumer, the pursuit of a product or a service that appears in a movie or a television show can be time-consuming and troublesome; and the demand may not be satisfied.

One advantage of the shopping methods, media, platforms, and systems described herein is to allow an audience to directly purchase a wide spectrum of products or services that appear in a currently playing multimedia. Another advantage is the simultaneous viewing of the multimedia and shopping for the products or services appearing therein. Consequently, the pursuit of the exact product or service in a playing multimedia becomes convenient, precise, and efficient. In addition, the simultaneous shopping has no interference with the playing of the multimedia; for example, video and/or audio is not stopped, paused, or interrupted. Thus, the continuity of the content is not compromised by the shopping feature. Furthermore, the inventions described herein also save time and effort for potential consumers; they may also present new opportunities for novel advertising or marketing strategies for manufacturers and retailers. Finally, the shopping methods, media, platforms, and systems described herein offer interactive cues to the shopping viewer to create a user-friendly shopping experience without interfering with the playback of the multimedia.

In one aspect, disclosed herein are computer-implemented methods for simultaneously viewing a playing multimedia and shopping for a product currently appearing in the playing multimedia comprising: providing, by a computer, an interface for playing the multimedia; providing, by the computer, an interface for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; providing, by the computer, an interface for accessing the shopping cart at the end of the viewing period; and providing, by the computer, an interface for purchasing, renting, or saving the product or a similar product or accessing information of the product or the similar product in the shopping cart at the end of the viewing period. In some embodiments, the multimedia comprises a video or an audio. In some embodiments, the multimedia is entertainment multimedia. In some embodiments, the multimedia is a television show or movie. In some embodiments, the multimedia does not comprise subject matter directed specifically to the product. In some embodiments, the multimedia does not advertise or market the product. In some embodiments, the multimedia is played using a media player. In further embodiments, the media player is Flash, Silverlight, or HTML 5 player. In some embodiments, the multimedia is played on a computer, a television, or a mobile electronic device. In some embodiments, the product is a piece of merchandise or a service that currently appears in the multimedia. In some embodiments, selecting the product comprises using an input device to interact with the product. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, highlighting, circling, contouring, a gesture, pointing, swiping, pressing, or crossing. In some embodiments, selecting the product is achieved by comparing a selection with pre-recorded tracking information. In further embodiments, the comparison comprises calculating the difference between the selection and a pre-recorded product in their locations, time points, or sizes. In further embodiments, the comparison comprises choosing a pre-recorded product with a minimal difference to the selection in their locations, time points, or sizes. In some embodiments, placing the product into the shopping cart comprises placing the exact product or a similar product into the shopping cart. In some embodiments, the shopping cart comprises an image, a name, a price, a quantity, or a description of the selected product. In some embodiments, the shopping cart is temporarily visible without substantially obscuring the playing multimedia. In some embodiments, the shopping cart is temporarily visible at the time when the product is added to the shopping cart. In some embodiments, the shopping cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, the product being not visually distinguished comprises being not highlighted, not marked, not contoured, not flashing, not glowing, not checked, not crossed out, not tagged, not labeled, or not superimposed with a shape, a color, a sign, a structure, a word, a phrase, or a sentence. In some embodiments, accessing the shopping cart comprises viewing or editing the shopping cart. In some embodiments, purchasing comprises placing an order for the product at one or more webpages. In some embodiments, accessing information of the product comprises connecting to a website of a manufacture, a dealer, a retailer, or obtaining information about physical stores that sells the product. In some embodiments, the similar product has similarity to the selected product in color, style, shape, manufacturer, composition, function, designer, or brand.

In another aspect, disclosed herein are non-transitory computer-readable storage media encoded with a computer program including instructions executable by a processor to create a shopping application for a viewer comprising: a software module for playing a multimedia; a software module for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; a software module for accessing the shopping cart at the end of the viewing period; and a software module for purchasing, renting, or saving the product or a similar product or accessing information of the product or the similar product in the shopping cart at the end of the viewing period. In certain embodiments, the multimedia comprises a video or an audio. In certain embodiments, the multimedia is entertainment multimedia. In certain embodiments, the multimedia is a television show or movie. In certain embodiments, the multimedia does not comprise subject matter directed specifically to the product. In certain embodiments, the multimedia does not advertise or market the product. In certain embodiments, the multimedia is played using a media player. In further embodiments, the media player is Flash, Silverlight, or HTML 5 player. In certain embodiments, the multimedia is played on a computer, a TV, or a portable smart electronic device. In certain embodiments, the product is a piece of merchandise or a service that currently appears in the multimedia. In certain embodiments, selecting the product comprises using an input device to interact with the product. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, highlighting, circling, contouring, a gesture, pointing, swiping, pressing, or crossing. In certain embodiments, selecting the product is achieved by comparing a selection with pre-recorded tracking information. In further embodiments, the comparison comprises calculating the difference between the selection and a pre-recorded product in their locations, time points, or sizes. In further embodiments, the comparison comprises choosing a pre-recorded product with a minimal difference to the selection in their locations, time points, or sizes. In certain embodiments, placing the product into the shopping cart comprises placing the exact product or a similar product into the shopping cart. In certain embodiments, the shopping cart comprises an image, a name, a price, a quantity, or a description of the selected product. In certain embodiments, the shopping cart is visible for a brief period of time without substantially obscuring the playing multimedia. In certain embodiments, the shopping cart is temporarily visible at the time when the product is added to the shopping cart. In certain embodiments, temporarily visibility comprises a time of less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In certain embodiments, the product being not visually distinguished comprises product being not highlighted, not marked, not contoured, not flashing, not glowing, not checked, not crossed out, not tagged, not labeled, or not superimposed with a shape, a color, a sign, a structure, a word, a phrase, or a sentence. In certain embodiments, accessing the shopping cart comprises viewing, or editing the shopping cart. In certain embodiments, purchasing comprises placing an order for the product at one or more webpages. In certain embodiments, accessing information of the product comprises connecting to a website of a manufacture, a dealer, a retailer, or obtaining information about physical stores that sells the product. In some embodiments, the similar product has similarity to the selected product in color, style, shape, manufacturer, composition, function, designer, or brand.

In another aspect, described herein are computer-implemented systems for simultaneously viewing a playing multimedia and shopping for a product currently appearing in the playing multimedia comprising a processor configured to provide a shopping application for a viewer comprising: a software module for playing the multimedia; a software module for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; a software module for accessing the shopping cart at the end of the viewing period; and a software module for purchasing, renting, or saving the product or a similar product or accessing information of the product or the similar product in the shopping cart at the end of the viewing period. In some embodiments, the multimedia comprises a video or an audio. In some embodiments, the multimedia is entertainment multimedia. In some embodiments, the multimedia is a television show or movie. In some embodiments, the multimedia does not comprise subject matter directed specifically to the product. In some embodiments, the multimedia does not advertise or market the product. In some embodiments, the multimedia is played using a media player. In further embodiments, the media player is Flash, Silverlight, or HTML 5 player. In some embodiments, the multimedia is played on a computer, a TV, or a portable smart electronic device. In some embodiments, the product is a piece of merchandise or a service that currently appears in the multimedia. In some embodiments, selecting the product comprises using an input device to interact with the product. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, highlighting, circling, contouring, a gesture, pointing, swiping, pressing, or crossing. In some embodiments, selecting the product is achieved by comparing a selection with pre-recorded tracking information of products. In further embodiments, the comparison comprises calculating the difference between the selection and each pre-recorded product in their locations, time points, or sizes. In further embodiments, the comparison comprises choosing a pre-recorded product with a minimal difference to the selection in their locations, time points, or sizes. In further embodiments, placing the product into the shopping cart comprises placing the exact product or a similar product into the shopping cart. In some embodiments, the shopping cart comprises an image, a name, a price, a quantity, or a description of the selected product. In some embodiments, the shopping cart is visible for a brief period of time without substantially obscuring the playing multimedia. In some embodiments, the shopping cart is visible at the time when the product is added to the shopping cart. In some embodiments, the cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, the product being not visually distinguished comprises product being not highlighted, not marked, not contoured, not flashing, not glowing, not checked, not crossed out, not tagged, not labeled, or not superimposed with a shape, a color, a sign, a structure, a word, a phrase, or a sentence. In some embodiments, accessing the shopping cart comprises viewing, or editing the shopping cart. In some embodiments, purchasing comprises placing an order for the product at one or more webpages. In some embodiments, accessing information of the product comprises connecting to a website of a manufacture, a dealer, a retailor, or obtaining information about physical stores that sells the product. In some embodiments, the similar product has similarity to the selected product, provided that the similarity is in color, style, shape, manufacturer, composition, function, designer, or brand.

In another aspect, described herein are computer-implemented systems for simultaneously viewing a playing multimedia and shopping for a product currently appearing in the playing multimedia comprising a processor configured to provide a media player application comprising: a software module for playing the multimedia; a software module for loading pre-recorded tracking information of products; a software module for a viewer to select the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; a software module to allow the viewer to access the shopping cart at the end of the viewing period; and a software module to allow the viewer to purchase, rent, or save the product or a similar product or access information of the product or the similar product at the end of the viewing period. In some embodiments, the multimedia comprises a video or an audio. In some embodiments, the multimedia is entertainment multimedia. In some embodiments, the multimedia is a television show or movie. In some embodiments, the multimedia does not comprise subject matter directed specifically to the product. In some embodiments, the multimedia does not advertise or market the product. In some embodiments, the media player is Flash, Silverlight, or HTML 5 player. In some embodiments, the multimedia is played on a computer, a TV, or a portable smart electronic device. In some embodiments, the product is a piece of merchandise or a service that currently appears in the multimedia. In some embodiments, the tracking information comprises a multimedia identification number, a product identification number, a location, a time point, or a size of each product. In further embodiments, the multimedia identification number is unique to the multimedia. In further embodiments, the product identification number is unique to the product. In some embodiments, the tracking information is in a format readable or executable by the media player. In further embodiments, the product comprises using an input device to interact with the product. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, highlighting, circling, contouring, a gesture, pointing, swiping, pressing, or crossing. In some embodiments, selecting the product is achieved by comparing a selection with the pre-recorded tracking information of each product. In some embodiments, the comparison comprises calculating the difference between the selection and a pre-recorded product in their locations, time points, or sizes. In some embodiments, the comparison comprises choosing a pre-recorded product with a minimal difference to the selection in their locations, time points, or sizes. In some embodiments, placing the product into the shopping cart comprises placing the exact product or a similar product into the shopping cart. In some embodiments, the shopping cart comprises an image, a name, a price, a quantity, or a description of the selected product. In some embodiments, the shopping cart is temporarily visible when the product is added. In some embodiments, the cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, viewing of the shopping cart is at the time when the product is added to the shopping cart. In some embodiments, the product being not visually distinguished comprises product being not highlighted, not marked, not contoured, not flashing, not glowing, not checked, not crossed out, not tagged, not labeled, or not superimposed with a shape, a color, a sign, a structure, a word, a phrase, or a sentence. In some embodiments, accessing the shopping cart comprises viewing or editing the shopping cart. In some embodiments, purchasing comprises placing an order for the product at one or more webpages. In some embodiments, accessing information of the product comprises connecting to a website of a manufacture, a dealer, a retailor, or obtaining information about physical stores that sells the product. In some embodiments, the similar product has similarity to the selected product, provided that the similarity is in color, style, shape, manufacturer, composition, function, designer, or brand.

In another aspect, described herein are computer-implemented systems for simultaneously viewing a playing multimedia and shopping for a product currently appearing in the playing multimedia comprising a processor configured to provide a product-tracking application comprising: a software module to allow a user to record tracking information of the product as a multimedia plays comprising: a software module to allow the user to mark the product at a first location, a second location, a first time point, and a second time point in the multimedia; a software module for saving the location and the time point of the product; a software module for estimating a unknown location of the product at a unrecorded time point between the first and second time point by interpolation; and a software module for exporting the tracking information of the product to a media player. In certain embodiments, the multimedia comprises a video or an audio. In certain embodiments, the multimedia is entertainment multimedia. In certain embodiments, the multimedia is a television show or movie. In certain embodiments, the multimedia does not comprise subject matter directed specifically to the product. In certain embodiments, the multimedia does not advertise or market the product. In certain embodiments, the multimedia is played using a media player. In further embodiments, the media player is Flash, Silverlight, or HTML 5 player. In certain embodiments, the multimedia is played on a computer, a TV, or a portable smart electronic device. In certain embodiments, the product is a piece of merchandise or a service that currently appears in the multimedia. In certain embodiments, the tracking information comprises a multimedia identification number, a product identification number, a location, a time point, or a size of the product. In further embodiments, the multimedia identification number is unique to the multimedia. In further embodiments, the product identification number is unique to the product. In certain embodiments, marking comprises tracing a contour of the product, or drawing a rectangle over the product. In certain embodiments, marking is manual, semi-automatic, or automatic. In certain embodiments, the location and the time point of the product is saved in a database in association with a multimedia identification number, a product identification number. In some embodiments, the graphic icon of the product is also saved into the database. In certain embodiments, the interpolation is linear or non-linear. In certain embodiments, the tracking information is in a format readable or executable by the media player. In certain embodiments, the media player is Flash, Silverlight, or HTML 5 player.

In another aspect, described herein are non-transitory computer-readable storage media encoding a video with associated data to create a shopping functions for a viewer comprising: providing, by a computer, an interface for playing a multimedia; providing, by the computer, an interface for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; providing, by the computer, an interface for accessing the shopping cart at the end of the viewing period; and providing, by the computer, an interface for purchasing, renting, or saving the product or a similar product or accessing information of the product or the similar product in the shopping cart at the end of the viewing period. In some embodiments, the video is an entertainment video. In some embodiments, the video is a television show or movie. In some embodiments, the video does not comprise subject matter directed specifically to the product. In some embodiments, the video does not advertise or market the product. In some embodiments, the video is played using a media player. In further embodiments, the media player is Flash, Silverlight, or HTML 5 player. In some embodiments, the video is played on a computer, a television, or a mobile electronic device. In some embodiments, the product is a piece of merchandise or a service that currently appears in the video. In some embodiments, selecting the product comprises using an input device to interact with the product. In some embodiments, the input device comprises a touchscreen, a mouse, a keyboard, a pointing device, a camera, a microphone, a motion sensor, a temperature sensor, or a pressure sensor. In some embodiments, the interaction comprises a touch, a click, a tap, highlighting, circling, contouring, a gesture, pointing, swiping, pressing, or crossing. In some embodiments, selecting the product is achieved by comparing a selection with pre-recorded tracking information. In further embodiments, the comparison comprises calculating the difference between the selection and a pre-recorded product in their locations, time points, or sizes. In further embodiments, the comparison comprises choosing a pre-recorded product with a minimal difference to the selection in their locations, time points, or sizes. In some embodiments, placing the product into the shopping cart comprises placing the exact product or a similar product into the shopping cart. In some embodiments, the shopping cart comprises an image, a name, a price, a quantity, or a description of the selected product. In some embodiments, the shopping cart is visible for a brief period of time without substantially obscuring the playing video. In some embodiments, the shopping cart is temporarily visible at the time when the product is added to the shopping cart. In some embodiments, the shopping cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, the product being not visually distinguished comprises product being not highlighted, not marked, not contoured, not flashing, not glowing, not checked, not crossed out, not tagged, not labeled, or not superimposed with a shape, a color, a sign, a structure, a word, a phrase, or a sentence. In some embodiments, accessing the shopping cart comprises viewing or editing the shopping cart. In some embodiments, purchasing comprises placing an order for the product at one or more webpages. In some embodiments, accessing information of the product comprises connecting to a website of a manufacture, a dealer, a retailor, or obtaining information about physical stores that sells the product. In some embodiments, the similar product has similarity to the selected product, provided that the similarity is in color, style, shape, manufacturer, composition, function, designer, or brand.

In another aspect, described herein are computer-implemented systems for simultaneously viewing a playing multimedia and shopping for a product currently appearing in the playing multimedia comprising a processor configured to provide a shopping cart application comprising: a software module to allow a viewer to select the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, and the selection of the product visually indicated by a graphic icon moving into the shopping cart; a software module to allow the viewer to access the shopping cart at the end of the viewing period; and a software module to allow the viewer to purchase, rent, or save the product or a similar product or access information of the product or the similar product in the shopping cart at the end of the viewing period. In some embodiments, the multimedia comprises a video or an audio. In some embodiments, the multimedia is entertainment multimedia. In some embodiments, the multimedia is a television show or movie. In some embodiments, the multimedia does not comprise subject matter directed specifically to the product. In some embodiments, the multimedia does not advertise or market the product. In some embodiments, the multimedia is played using a media player. In further embodiments, the media player is Flash, Silverlight, or HTML 5 player. In some embodiments, the multimedia is played on a computer, a TV, or a portable smart electronic device. In some embodiments, the product is a piece of merchandise or a service that currently appears in the multimedia. In some embodiments, selecting the product comprises using an input device to interact with the product. In further embodiments, the input device comprises a touchscreen, a mouse, a keyboard, a pointing device, a camera, a microphone, a motion sensor, a temperature sensor, or a pressure sensor. In further embodiments, the interaction comprises a touch, a click, a tap, highlighting, circling, contouring, a gesture, pointing, swiping, pressing, or crossing. In some embodiments, selecting the product is achieved by comparing a selection with pre-recorded tracking information. In further embodiments, the comparison comprises calculating the difference between the selection and a pre-recorded product in their locations, time points, or a sizes. In further embodiments, the comparison comprises choosing a pre-recorded product with a minimal difference to the selection in their locations, time points, or sizes. In some embodiments, placing the product into the shopping cart comprises placing the exact product or a similar product into the shopping cart. In some embodiments, the shopping cart comprises an image, a name, a price, a quantity, or a description of the selected product. In some embodiments, the shopping cart is visible for a brief period of time when the product is added. In some embodiments, the shopping cart is temporarily visible at the time when the product is added to the shopping cart. In some embodiments, the cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, the product being not visually distinguished comprises product being not highlighted, not marked, not contoured, not flashing, not glowing, not checked, not crossed out, not tagged, not labeled, or not superimposed with a shape, a color, a sign, a structure, a word, a phrase, or a sentence. In some embodiments, accessing the shopping cart comprises viewing or editing the shopping cart. In some embodiments, purchasing comprises placing an order for the product at one or more webpages. In some embodiments, accessing information of the product comprises connecting to a website of a manufacture, a dealer, a retailer, or obtaining information about physical stores that sells the product. In some embodiments, the similar product has similarity to the selected product, provided that the similarity is in color, style, shape, manufacturer, composition, function, designer, or brand.

DETAILED DESCRIPTION OF THE INVENTION

Figure 1:
FIG. 1 shows a non-limiting example of a GUI for allowing a viewer to purchase a product that appears in a playing multimedia without interferencing the playing; in this case, an interface for viewing a multimedia with the option to select a product to be placed in a shopping cart while viewing. Also in this case, products are not visually identified.

Audiences are often attracted to products, services, events, or locations that appear in a movie, a television show, a live event, or similar multimedia. Unfortunately, most of the existing multimedia are not produced for the purpose of advertising or marketing products or services that appear in them. As a result, there is very limited information available for the audience to acquire the products or services appearing in a multimedia. Currently, there is a very limited number of shopping methods or systems that allow an audience to directly purchase a piece of merchandise that appears in a playing multimedia. Furthermore, none of the currently available shopping methods or systems provide an efficient and non-interfering shopping experience during the viewing of a multimedia. As a consumer, a pursuit of a product or a service that appears in a movie or a TV show can be time-consuming and troublesome.

One advantage of the shopping methods, media, platforms, and systems described herein is to allow an audience to directly purchase a wide spectrum of products or services that appear in a currently playing multimedia. Another advantage is the simultaneous viewing of the multimedia and shopping of the products or services appear therein. Consequently, the pursuit of the exact product or service in a playing multimedia becomes convenient, precise, and efficient. In addition, the simultaneous shopping has no effect on the playing of the multimedia, thus continuity and artistic integrity of the content is preserved. Furthermore, the inventions described herein also save time and effort for potential consumers; they also present new opportunities for novel advertising or marketing strategies for manufacturers and retailers.

Described herein, in certain embodiments, are computer-implemented methods for simultaneously viewing a playing multimedia and shopping for a product currently appearing in the playing multimedia comprising: a software module for playing a multimedia; a software module for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; a software module for accessing the shopping cart at the end of the viewing period; and a software module for purchasing, renting, or saving the product or a similar product or accessing information of the product or the similar product in the shopping cart at the end of the viewing period.

Also described herein, in various embodiments, are non-transitory computer-readable storage media encoded with a computer program including instructions executable by a processor to create a shopping application for a viewer comprising: a software module for playing the multimedia; a software module for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; a software module for accessing the shopping cart at the end of the viewing period; and a software module for purchasing, renting, or saving the product or a similar product or accessing information of the product or the similar product in the shopping cart at the end of the viewing period.

Also described herein in various embodiments, are computer-implemented platforms and systems for simultaneously viewing a playing multimedia and shopping for a product currently appearing in the playing multimedia comprising a processor configured to provide a shopping application for a viewer comprising: a software module for playing the multimedia; a software module for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; a software module for accessing the shopping cart at the end of the viewing period; and a software module for purchasing, renting, or saving the product or a similar product or accessing information of the product or the similar product in the shopping cart at the end of the viewing period.

Also described herein in various embodiments, are computer-implemented platforms and systems for simultaneously viewing a playing multimedia and shopping for a product currently appearing in the playing multimedia comprising a processor configured to provide a media player application comprising: a software module for playing the multimedia; a software module for loading pre-recorded tracking information of products; a software module for a viewer to select the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; a software module to allow the viewer to access the shopping cart at the end of the viewing period; and a software module to allow the viewer to purchase, rent, or save the product or a similar product or access information of the product or the similar product at the end of the viewing period.

Also described herein in various embodiments, are computer-implemented platforms and systems for simultaneously viewing a playing multimedia and shopping for a product currently appearing in the playing multimedia comprising a processor configured to provide a product-tracking application comprising: a software module to allow a user to record tracking information of the product as a multimedia plays comprising: a software module to allow the user to mark the product at a first location, a second location, a first time point, and a second time point in the multimedia; a software module for saving the location and the time point of the product; a software module for estimating a unknown location of the product at a unrecorded time point between the first and second time point by interpolation; and a software module for exporting the tracking information of the product to a media player.

Also described herein in various embodiments, are non-transitory computer-readable storage media encoding a video with associated data to create shopping functions for a viewer comprising: providing, by a computer, an interface for playing a multimedia; providing, by the computer, an interface for selecting the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart; providing, by the computer, an interface for accessing the shopping cart at the end of the viewing period; and providing, by the computer, an interface for purchasing, renting, or saving the product or a similar product or accessing information of the product or the similar product in the shopping cart at the end of the viewing period.

Also described herein in various embodiments, are computer-implemented platforms and systems for simultaneously viewing a playing multimedia and shopping for a product currently appearing in the playing multimedia comprising a processor configured to provide a shopping cart application comprising: a software module to allow a viewer to select the product appearing in the playing multimedia during a viewing period to place the product into a shopping cart without pausing or stopping the playing multimedia, provided that the product is not visually distinguished as selectable in the playing multimedia, the shopping cart appearing temporarily when the product is added without disturbing the playing multimedia, and the selection of the product visually indicated by a graphic icon moving into the shopping cart; a software module to allow the viewer to access the shopping cart at the end of the viewing period; and a software module to allow the viewer to purchase, rent, or save the product or a similar product or access information of the product or the similar product in the shopping cart at the end of the viewing period.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Multimedia

In some embodiments, the platforms, systems, media, and methods described herein include a multimedia or use of the same. In some embodiments, multimedia comprises electronic or digital presentation of text, graphics, images, videos, animations, interactivity, or sound in an integrated manner. In some embodiments, the multimedia has one or more spatial dimensions. In some embodiments, the multimedia has one or more temporal or time dimensions. In further embodiments, multimedia comprises a video, a motion picture, an animated picture, a film, a footage, a movie, a television show, an audio, a music video, a trailer, an advertisement, a talk show, a reality show, a documentary film, a video game, a CD, a DVD, a Karaoke or recording, a camera recording, a microphone recording, an audio book, a cartoon, a navigation display, a mobile application, a mobile game, a radio broadcasting, a TV channel broadcasting, a recording or a live broadcasting of an auction, an entertainment event, a fundraising event, a charity event, a community event, a party, a religious event, a political event, a healthcare event, a conference, a talk, a sport event, a presentation, an interview, a debate, a meeting, an educational session, or combinations of the same. In some embodiments, multimedia comprises interactions via an input device. In further embodiments, the input device comprises a touchscreen, a mouse, a keyboard, a pointing device, a remote control, a camera, a microphone, a motion sensor, an eye movement sensor, a temperature sensor, an optical sensor, or a pressure sensor. In further embodiments, the interaction comprises a touch, a click, a tap, highlighting, circling, contouring, a gesture, pointing, swiping, pressing, an eye movement, or crossing. In some embodiments, the multimedia includes editing of the sound, image, text, animation, or video contents. In some embodiments, the multimedia is pre-recorded. In other embodiments, the multimedia is live broadcasting. In some embodiments, the multimedia is related to entertainment. In other embodiments, the multimedia is related to politics, education, sports, arts, economy, charity, marketing, environment, technology, science, culture, history, traditions, business, healthcare, foods, agriculture, real estate, auction, news, adventure, manufacturing, legal information, transportation, fitness, diet, cuisines, advertisement, marketing, or combinations of the same. In some embodiments, the multimedia is projected to a display device. In some embodiments, the display device comprises a surface and a support suitable for viewing projected multimedia. In further embodiments, the display device includes a projection screen, a white board, a black board, a piece of cloth, a wall, a sheet, a door, a curtain, a stage, a floor, a tent, a part of the human body, air, a towel, a panel, a desk, a window, a roof, a fountain, a waterfall, a water screen, a banner, a piece of paper, a folder, a piece of glass, or the like. In some embodiments, the multimedia comprises one or more still images, photos, graphics, pictures, figures, drawings, line arts, sketches, or combinations of the same. In some embodiment, the multimedia is an electronic book, magazine, chapter, paragraph, article, newspaper, journal, article, column, advertisement, abstract, or the like. In some embodiments, the multimedia is displayed on a display device. In further embodiments, the display device comprises a screen, a TV, a monitor, a LED screen, a LCD screen, a CRT screen, a plasma screen, a computer, a tablet, a mobile device, a navigation system, a to-go ordering system, an oversized screen, an electronic banner, a gym equipment, a google glass, a smart watch, a smart wrist band, a vending machine, a laundry machine, an ATM machine, or the like. In further embodiments, the multimedia is displayed using Quick notes, an add-on, an application programmable interface (API), a software, a script, a media player, a mobile application (APP), a web browser, or combinations of the same. In some embodiments, the multimedia is used directly or indirectly to enable augmented reality, provided that augmented reality is a view of a physical, real-world environment whose elements are augmented by a computer-generated sensory input such as sound, video, graphic, GPS data, or the like. In some embodiments, the multimedia is played with a media player. In some embodiments, the multimedia is in a format compatible, readable, executable by a media player. In some embodiments, the multimedia is in a digital format of JPG, TIFF, PNG, JPEG, RAW, BMP, HDR, SVG, PPM, PGM, PBM, PNM, WEBP, EXIF, JFIF, MP2, MP3, MP4, CD, DVD, AVI, GIF, WAV, AIFF, MPEG, DAT, MOV, M4V, VOB, WMA, AMR, AAC, RM, VOX, VOC, MKV, WRAP, MING, MPG, AAF, 3GP, ASF, SWF, SVI, WMV, or the like. In some embodiments, the multimedia is in a roll of film, vinyl, laser disc, or the like. In some embodiments, the multimedia is played on the back of a seat. In other embodiments, the multimedia is played on any other part of a seat. In some embodiments, the multimedia is played in a car, a plane, a helicopter, a taxi, a bus, a train, a shuttle, a ferry, a boat, a roller-coaster, a cabin, a lodge, a yacht, a ship, a conference room, a hotel room, a restaurant, a convention center, a residential area, a picnic area, a waiting area, a library, a theater, a zoo, a stadium, a cathedral, a chapel, a church, a chamber, a classroom, an office, a museum, a bank, a gallery, a lobby, a wheel chair, a restaurant, a casino, a court, a boarding area, a bus stop, a train stop, a ferry stop, a restroom, a laundry room, a lobby, a mall, a resort, a gym, a dorm, a parking lot, a tower, a park, a supermarket, a store, a gas station, a postal office, a club, a residential building, an auto shop, a fire station, an ambulance, a bank, a business building, a plant, a mill, a farm, a market, a factory, a zoo, a store, a golf course, a fitting room, a wardrobe, or the like. In some embodiments, the multimedia is played on a screen, a TV, a monitor, a LED screen, a LCD screen, a CRT screen, a plasma screen, a computer, a tablet, a mobile device, a navigation system, a to-go ordering system, an oversized screen, an electronic banner, a gym equipment, a vehicle, a ship, a ferry, a yacht, a bike, a motorcycle, a GPS, a cell phone, a iPad, a iPod, a kindle, a google glass, a smart watch, a smart wrist band, a vending machine, a laundry machine, an ATM machine, a Jacuzzi, a robot, a wheel chair, a piece of furniture, a shopping cart, an emergency phone, a mall directory, a window, a wall, a door, a roof, a floor, a stair case, an elevator, an escalator, a parking meter, a ticket counter, a lottery machine, a slot machine, a lake, air, a tower, or the like. In some embodiments, the multimedia is not for the sole purpose of advertising or marketing.

Media Player

In some embodiments, the platforms, systems, media, and methods described herein include a media player or use of the same. In some embodiments, the media player is a commercially available media player. In other embodiments, the media player is developed based on a commercially available media player. In some embodiments, the media player is a commercially available media player with modifications. In some embodiments, the media player is installed on a computer, a tablet, or a TV. In other embodiments, the media player is installed on a mobile electronic device. In other embodiments, the media player is installed on an electronic device. In some embodiments, the media player is installed on the back of a seat. In some embodiments, the media player is installed in a car, a plane, a helicopter, a taxi, a bus, a train, a shuttle, a ferry, a boat, a roller-coaster, a cabin, a lodge, a yacht, a ship, a conference room, a hotel room, a restaurant, a convention center, a residential area, a picnic area, a waiting area, a library, a theater, a zoo, a stadium, a cathedral, a chapel, a church, a chamber, a classroom, an office, a museum, a bank, a gallery, a lobby, a wheel chair, a restaurant, a casino, a court, a boarding area, a bus stop, a train stop, a ferry stop, a restroom, a laundry room, a lobby, a mall, a resort, a gym, a dorm, a parking lot, a tower, a park, a supermarket, a store, a gas station, a postal office, a club, a residential building, an auto shop, a fire station, an ambulance, a bank, a business building, a plant, a mill, a farm, a market, a factory, a zoo, a store, a golf course, a fitting room, a wardrobe, or the like. In some embodiments, the media player is installed on an oversized screen, an electronic banner, a LED screen, a LCD screen, a CRT screen, a plasma screen, a monitor, a gym equipment, a vehicle, a ship, a ferry, a yacht, a boat, a bike, a motorcycle, a GPS, a cell phone, a to-go ordering system, a navigation system, a iPad, a iPod, a kindle, a google glass, a smart watch, a smart wrist band, a vending machine, a laundry machine, an ATM machine, a Jacuzzi, a robot, wheel chair, a piece of furniture, a shopping cart, an emergency phone, a mall directory, a window, a wall, a roof, a door, a floor, a stair case, an elevator, an escalator, a parking meter, a ticket counter, a lottery machine, a slot machine, or the like. In some embodiments, the media player is embedded into a web browser. In some embodiments, the media player is optionally connected to a Bluetooth or a GPS. In some embodiments, the media player is optionally connected a computer network. In further embodiments, the media player is optionally connected to the Internet such that it accesses the World Wide Web. In still further embodiments, the media player is optionally connected to a cloud computing infrastructure. In other embodiments, the media player is optionally connected to an intranet. In other embodiments, the media player is optionally connected to a data storage device. In some embodiments, the media player comprises Flash, Silverlight, QuickTime, HTML 5, Windows media player, iTunes, SMPlayer, Amarok, Audacious, Banshee, MPlayer, Rhythmbox, Totem, VLC, xine, Apprentice Video, CorePlayer, DSPlayer, CrystalPlayer, GOM Player, FFplay, JetAudio, JRiver Media Center, K-Multimedia player, Mac Blu-ray player, Plex, TotalMedia theater, or combinations of the same. In some embodiments, the media player allows interactions via an input device. In further embodiments, the input device comprises a touchscreen, a mouse, a keyboard, a pointing device, a remote control, a camera, a microphone, a motion sensor, an eye movement sensor, a temperature sensor, an optical sensor, or a pressure sensor. In further embodiments, the interaction comprises a touch, a click, a tap, highlighting, circling, contouring, a gesture, pointing, swiping, pressing, an eye movement, or crossing.

Referring to FIG. 1, in a particular embodiment, a viewer plays a multimedia using a media player with the option to select a product during the viewing period. Also in this embodiment, products for purchase are not visually distinguished as selectable to eliminate interferences with the viewing. In this embodiment, the media player is Flash.

Products

In some embodiments, the platforms, systems, media, and methods described herein include a product or the like. In some embodiments, the product comprises a piece of merchandise, a service, or an object that are legitimate to purchase, rent, lease, loan. In other embodiments, the product comprises a person that is legitimate to hire for a temporary or long term. In some embodiments, the products include groceries, foods, clothes, arts, furniture, hardwares, plants, flowers, live stocks, pets, books, electronics, cosmetics, skin care, jewelries, hotel rooms, tickets, liquors, cars, planes, helicopters, trucks, trains, yachts, ships, kayaks, hot balloons, antiques, animals, plants, casino chips, memberships, houses, villas, condos, apartments, shoes, vacation packages, park passes, recipes, music clips, eye wares, accessories, electronic books, handbags, tours, courses, messages, manicure, pedicure, fitness trainings, plastic surgeries, vehicles, water vehicles, tutor services, legal services, career services, tour guidance, real estate services, counseling, consulting, physical therapies, dental services, wedding services, pre-marital services, coaching, childcare services, summer camps, catering, event planning, photographing, hairdos, acupunctures, chiropractic services, driving, dating services, surgeries, medical imaging, reproductive services, elderly care, retirement services, financial services, translation services, dry cleaning, housekeeping, automobile maintenance and repair, home decor and renovation, plumbing, gardening, tax services, or the like. In some embodiments, the products include a body guard, a butler, a doctor, a realtor, an agent, a veterinarian, a pastor, a secretary, a florist, a private detective, a stylist, a personal shopper, a nanny, a farmer, an administrator, a web designer, an engineer, a mathematician, a trader, a midwife, a fitness trainer, a gardener, a landscaper, an architect, a director, a designer, a poet, a singer, a magician, a clown, a Santa Claus, a pianist, a band, an orchestra, a circus, a violinist, a conductor, a security, a ranger, a lawyer, an accountant, a handyman, a driver, an actor, a coach, a teacher, a translator, a surgeon, a Feng Shui master, an IT specialist, a tour guide, a pilot, a writer, a pastor, a plumber, a decorator, a housekeeper, a barber, a cook, an electrician, a counselor, a consultant, a contractor, a social worker, a psychic, psychiatrist, or the like.

In some embodiments, the product is not visually distinguished as selectable in the playing media to eliminate the interferences to the viewing. In further embodiments, not visually distinguished comprises not highlighted, not marked, not contoured, not flashing, not glowing, not checked, not crossed out, not tagged, not labeled, or not superimposed with a shape, a color, a sign, a structure, a word, a phrase, a sentence, a symbol, or combinations of the like. In some embodiments, the product is visually distinguished in the playing media for a brief period of time only after it is selected to be placed into a shopping cart. In further embodiments, visually distinguished comprises highlighted, marked, contoured, flashing, glowing, checked, crossed out, tagged, labeled, superimposed with a shape, a color, a sign, a structure, a word, a phrase, a symbol, or a sentence, or combinations of the like.

Shopping Cart

In some embodiments, the platforms, systems, media, and methods described herein include a shopping cart or the like. In further embodiments, the shopping cart comprises information pertaining to one or more selected products and/or services. In still further embodiments, the product/service information comprises, for example, an image, a name, a price, a quantity, a logo, a description, a location, a manufacturer, a model, or the like.

The shopping carts described herein optionally provide a wide range of functions. In some embodiments, a shopping cart provides further information about one or more selected products or services. In other embodiments, a shopping cart allows a viewing consumer the option to purchase one or more selected products or services. In a particular embodiment, a shopping cart directs a viewing consumer to a third party (e.g., a merchant, vendor, manufacturer, reseller, retailer, etc.) to purchase a selected product or service. In yet other embodiments, a shopping cart allows a viewing consumer the option to share one or more selected products or services. In yet other embodiments, a shopping cart allows a viewing consumer the option to save one or more selected products or services for further research or viewing.

In some embodiments, a shopping cart allows a viewing consumer to edit one or more selected products and/or services in the cart after a viewing period. In further embodiments, editing comprises saving, adding, removing, transferring, sending, or the like.

In further embodiments, a software module is used to identify and provide a product similar to a selected product in the shopping cart. In further embodiments, the similar product is provided based on the viewer's preferences in color, style, shape, manufacturer, dealer, origin, designer, brand, make, raw material, location, composition, price, description, function, review, rating, warranty, customs option, acceptable payment options, financing options, insurance, return policy, service policy, quality, availability, or combinations of the like. For example, if a viewing consumer added an expensive designer handbag to the shopping cart during viewing of a television show video, a software module, in one embodiment, utilizes an algorithm to identify a similar, but less expensive alternative handbag as an option for the consumer. In further embodiments, the similar product is edited in the shopping cart.

In some embodiments, a different product that appears in the same multimedia is provided in the shopping cart, wherein the different product is related to the selected product. In further embodiment, the different product is used in a same occasion with the selected product. In other embodiments, the different product improves the function or has a complimentary function of the selected product. In other embodiments, the different product has a discount price. In other embodiments, the different product completes a set with the selected product. For example, if a viewing consumer added a necklace to the shopping cart during viewing of a movie video, a software module, in one embodiment, identifies a pair of earrings that match and complement the selected necklace.

In some embodiments, viewing of the shopping cart is at the time when the product is added to the shopping cart. In further embodiments, the shopping cart appears from the right, left, top, or bottom of the playing multimedia. In further embodiments, the shopping cart flies, floats, or slides in from the right, left, top, or bottom of the playing multimedia. In other embodiments, the viewing of the shopping cart is activated by an interaction with an input device. In further embodiments, the input device comprises a touchscreen, a mouse, a keyboard, a pointing device, a remote control, a camera, a microphone, a motion sensor, an eye movement sensor, a temperature sensor, an optical sensor, or a pressure sensor. In further embodiments, the interaction comprises a touch, a click, a tap, highlighting, circling, contouring, a gesture, pointing, swiping, pressing, an eye movement, or crossing. In some embodiments, the shopping cart appears within the multimedia displaying frame. In other embodiments, the shopping cart appears outside the multimedia displaying frame. In some embodiments, the shopping cart appears temporarily. In further embodiments, the cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, the shopping cart is visible for a period of time that is no more than the total playing time of the media without obscuring the viewing of the multimedia. In some embodiments, the location that the shopping cart appears is selected by a viewer via interaction with an input device.

In some embodiments, the shopping cart includes a multimedia clip for a selected product, provided that the multimedia clip includes a time point, a location, a coordinate, a name, a graphic icon of the selected product, an image frame or frame number of the selected product, or the like. In other embodiments, the multimedia clip is a connecting means to provide connection to one or more time points, locations, images, frames that the selected product appears in. In some embodiments, the multimedia clip includes a number of time points at which the selected multimedia appears, provided that the number is no more than the total number of time points at which the selected product appears in the multimedia. In some embodiments, the multimedia clip includes a number of image frames in which the selected multimedia appears, provided that the number is no more than the total number of image frames that the selected product appears in the multimedia. In some embodiments, the multimedia clip includes a video that includes a number of video frames in which the selected multimedia appears, provided that the number is no more than the total number of video frames that the selected product appears in the multimedia. In some embodiments, the multimedia clip is added into a shopping cart. In some embodiments, the multimedia clip is saved, reviewed, edited in the shopping cart, transferred to another shopping cart, or sent by an email, a text message, a video message, an image message, a web link, a web page, or the like.

In some embodiments, the shopping cart includes a list, provided that the list contains one or more of the selected product or similar products. In further embodiments, the list is saved, reviewed, edited, transferred to another shopping cart, or sent by email, text message, voice message, image message, video message, web link, a web page, or the like.

Figure 4:
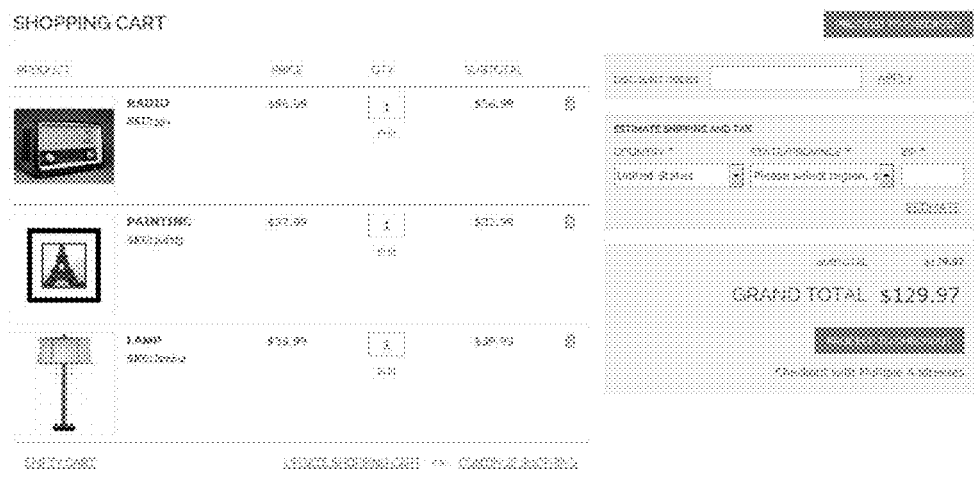
FIG. 4 shows a non-limiting example of a GUI for allowing a viewer to purchase a product that appears in a playing multimedia without interferencing the playing; in this case, an interface for accessing the shopping cart at the end of playback.

Referring to FIG. 4, in a particular embodiment, a viewer accesses a shopping cart at the end of a viewing period. In this embodiment, items in the shopping cart are shown with their images, quantities, prices, and other optional information. Also in this embodiment, the viewer optionally edits the shopping cart, places an order, or saves the items in the shopping cart for future purchase.

Shopping Application

In some embodiments, the platforms, systems, media, and methods described herein include a shopping application. In further embodiments, the shopping application includes tools and elements to enable viewers to simultaneously view a playing media and shop for a product currently appearing in the playing media without interferences to the viewing of the multimedia. In some embodiments, a shopping application includes a software module for selecting the product that appears in a playing multimedia during a viewing period to place the product into a shopping cart without pausing or stopping the playing multimedia. In some embodiments, the product is not visually distinguished as selectable in the playing multimedia. In some embodiments, the shopping cart appears temporarily when the product is added without disturbing the playing media. In some embodiments, the temporary period of time is less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, the selection of the product is visually indicated by a graphic icon moving into the shopping cart. In some embodiments, the graphic icon comprises an image, picture, drawing, graph, line art or the product, or the like. In some embodiments, the graphic icon moves into the shopping cart in a brief period of time. In some embodiments, the multimedia does not comprise subject matter directed specifically to the product. In some embodiments, the multimedia does not advertise or market the product. In some embodiments, selecting the product comprises using an input device to interact with the product. In further embodiments, the input device comprises a touchscreen, a mouse, a keyboard, a pointing device, a remote control, a camera, a microphone, a motion sensor, an eye movement sensor, a temperature sensor, an optical sensor, or a pressure sensor. In further embodiments, the interaction comprises a touch, a click, a tap, highlighting, circling, contouring, a gesture, pointing, swiping, pressing, an eye movement, or crossing. In some embodiments, selecting the product comprises one-click shopping. In further embodiments, one-click shopping comprises placing an order with only one interaction with the product via the input device. In some embodiments, selecting the product is achieved by comparing a selection with pre-recorded tracking information of products. In further embodiments, the pre-recorded tracking information comprises a multimedia identification number, a product identification number, a name, a coordinate, a location, a time point, a color, a size, a color, a shape, a function, a composition, or a description of each product that appears in the multimedia, or combinations of the same. In further embodiments, the comparison comprises calculating the difference between the selection and each pre-recorded product in their locations, time points, sizes, coordinates, or combinations of the like. In further embodiments, the comparison comprises choosing a pre-recorded product with a minimal difference to the selection in their locations, time points, sizes, coordinates, or combinations of the like. In further embodiments, selecting the product comprises selecting an identification number of the multimedia, an identification of the product, a name, a description, a coordinate, a location, a time point, a color, a size, or the like. In some embodiments, selecting the product is achieved by selecting from a list of products. In further embodiments, the list of products is provided in a temporarily visible list. In further embodiments, the list of products is provided in an interaction activated list. In some embodiments, the shopping cart comprises an image, a name, a price, a quantity, a description of the selected product. In further embodiments, the shopping cart comprises products that are similar to the selected product. In further embodiments, the similar products comprise similarity in color, style, shape, manufacturer, dealer, origin, designer, brand, make, raw material, location, composition, price, description, function, review, rating, warranty, customs option, acceptable payments, financing options, insurance, return policy, service policy, quality, availability, or combinations of the like. In some embodiments, viewing of the shopping cart is at the time when the product is added to the shopping cart. In further embodiments, the shopping cart appears from the right, left, top, or bottom of the playing multimedia. In other embodiments, the shopping cart fly in or float in from the right, left, top, or bottom of the playing multimedia. In some embodiments, the shopping cart appears within the multimedia displaying frame. In other embodiments, the shopping cart appears outside the multimedia displaying frame. In other embodiments, the viewing of the shopping cart is activated by the interaction with the input device. In some embodiments, the cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second. In some embodiments, the shopping cart is visible for a period of time that is no more than the total playing time of the media without obscuring the viewing of the multimedia. In some embodiments, the location that the shopping cart appears is selected by a viewer via interaction with an input device. In some embodiments, the product is not visually distinguished as selectable in the playing media. In further embodiments, not visually distinguished comprises not highlighted, not marked, not contoured, not flashing, not glowing, not checked, not crossed out, not tagged, not labeled, or not superimposed with a shape, a color, a sign, a structure, a word, a phrase, a symbol, or a sentence, or combinations of the like. In some embodiments, the product is visually distinguished in the playing media only after it is selected to be placed into a shopping cart. In further embodiments, visually distinguished comprises highlighted, marked, contoured, flashing, glowing, checked, crossed out, tagged, labeled, superimposed with a shape, a color, a sign, a structure, a word, a phrase, a symbol, or a sentence, or combinations of the like.

In some embodiments, a shopping application includes a software module for accessing the shopping cart at the end of the viewing period. In some embodiments, accessing the shopping cart comprises viewing, editing the shopping cart.

In some embodiments, a shopping application includes a software module for purchasing, renting, or saving the product or a similar product or accessing information of the product or the similar product in the shopping cart at the end of the viewing period. In some embodiments, purchasing comprises placing an order at one or more webpages. In some embodiments, accessing information of the product or the similar product comprises connecting to a website of a manufacture, a dealer, a retailer, or obtaining information about physical stores that sells the product. In some embodiments, the product or the similar product in the shopping cart is saved for future purchases.

Figure 2:
FIG. 2 shows a non-limiting example of a GUI for allowing a viewer to purchase a product that appears in a playing multimedia without interferencing the playing; in this case, an interface for selecting a product to place into a shopping cart. Also in this case, an interface for temporarily viewing a shopping cart while adding a product.

Referring to FIG. 2, in a particular embodiment, a viewer selects a product currently appears in a playing multimedia to place it into a shopping cart. The product being selected is visually indicated by a graphic icon flying into the shopping cart, confirming the successful selection of the product. Also in this embodiment, a shopping cart is visible temporarily after sliding into the viewing frame from the right. In this embodiment, the shopping cart appears when the product is added to the shopping cart with a cart logo and the products in the cart.

Figure 3:
FIG. 3 shows a non-limiting example of a GUI for allowing a viewer to purchase a product that appears in a playing multimedia without interferencing the playing; in this case, an interface for selecting a product to place into a shopping cart. Also in this case, an interface for temporarily viewing a shopping cart while adding a product.

Referring to FIG. 3, in a particular embodiment, a viewer selects a product currently appears in a playing multimedia to place it into a shopping cart. A temporary notification as 'Item already in the cart' appears at the bottom of the viewing frame. Also in this embodiment, a shopping cart is temporarily visible from the right of the viewing frame. Also in this embodiment, items in the shopping cart and the shopping cart icon are temporarily visible.

Product-Tracking Application

In some embodiments, the platforms, systems, media, and methods described herein include a product-tracking application. In further embodiments, the product-tracking application includes tools and elements to enable viewers to simultaneously view a playing media and shop for a product currently appearing in the playing media without interferences to the viewing of the multimedia.

In some embodiments, a product-tracking application includes a software module to allow a user to record tracking information of the product as the multimedia plays comprising a software module to allow the user to mark the product at a first location, a second location, a first time point, and a second time point in the media. In some embodiments, the first and second time points are at adjacent multimedia frames. In other embodiments, the first and second time points are at non-adjacent frames. In some embodiments, the first and second time points are the first and last multimedia frames in which the product appears. In further embodiments, marking comprising tracing a contour of the product, or drawing a shape over the product. In further embodiments, the shape comprises a rectangle, a squire, a circle, an oval, a diamond, a rhombus, a triangle, a trapezoid, a pentagon, a hexagon, an irregular shape, or the like. In some embodiments, the marking is manual, semi-automatic, semi-manual, or automatic.

Figure 5:
FIG. 5 shows a non-non-limiting example of a GUI for a product-tracking application; in this case, an interface for a user to mark a product at a first location at a first time point.

Referring to FIG. 5, in a particular embodiment, to record tracking information of each product in a playing media, a user marks a product at its first location at a first time point. In this embodiment, the product is manually contoured with a rectangle and superimposed with a color.

Figure 6:
FIG. 6 shows a non-non-limiting example of a GUI for a product-tracking application; in this case, an interface for a user to mark a product at a second location at a second time point.

Referring to FIG. 6, in a particular embodiment, to record tracking information of each product in a playing media, a user marks a product at its second location at a second time point. In this embodiment, the product is contoured with a rectangle and superimposed with a color. Also in this embodiment, the same product at its first location at its first time point is also shown with a different, superimposed color.

In some embodiments, a product-tracking application includes a software module for saving the location and the time point of the product. In further embodiments, the location and the time point are saved into a database in association with a multimedia identification number, a product identification number. In further embodiments, the tracking information is saved into the database in association with a multimedia identification number, a product identification number. In some embodiments, the graphic icon of the product is also saved into the database in association with a multimedia identification number or a product identification number. In further embodiments, the tracking information comprises a multimedia identification number, a product identification number, a name, a coordinate, a location, a time point, a color, a size, a color, a shape, a function, a composition, or a description of each product that appears in the multimedia, or combinations of the same. In some embodiments, a product-tracking application includes a software module for estimating an unknown location of the product at an unrecorded time point between the first and second time point by interpolation. In some embodiment, the interpolation is linear. In other embodiments, the interpolation is nonlinear, polynomial, Gaussian, spline, or the like. In some embodiments, a product-tracking application includes a software module for exporting the tracking information of the product to a media player. In further embodiments, the tracking information is exported in a format readable, compatible, or executable to a media player. In some embodiments, the tracking information is saved as a script, Actionscript code, a database table, a database, a table, or the like. In some embodiments, the database table is read by a media player over a web protocol.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, user, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, sub-notebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

EXAMPLES

The following illustrative examples are representative of embodiments of the software applications, systems, methods, and media described herein and are not meant to be limiting in any way.

Example 1

Simultaneous Shopping while Watching a Television Show

A woman watches an episode of a television show named "House of Cards" on her desktop using Flash. When the main actor appears in the playing show wearing a sleep robe, her attention was drawn to the sleep robe. The sleep robe strikes her as a great birthday gift for her husband. When the show continues, she drags her mouse onto the sleep robe and clicks on it. A graphic icon of the robe quickly flies across the screen into a shopping cart, which temporarily appears outside the viewing frame of her show. After she visually confirms that the sleep robe is added to the shopping cart, the shopping cart becomes invisible. The whole shopping/selecting process takes less than one second while the show is continuously playing without disturbance. After finishing the entire episode, she is directed to a webpage of her shopping cart. The pieces that she selects appear in the shopping cart along with their quantities, sizes, colors, and prices. In addition, alternative products are also provided for her review in the shopping cart along with products that are related to the product she selected. As an example, the matching slippers to the sleep robe that she selects is added to her shopping cart The exact sleep robe in the show costs $549.00, and an alternative with similar color, material, and style costs only $129.00. She selects the less expensive alternative, deletes a couple of impulsive pieces in the cart, and checks out her shopping cart.

Example 2

Product-Tracking in a Television Show

A user plays an episode of a television show named "House of Cards" on his laptop using Flash for the purpose of tracking each and every product that appears in the show. When he sees the first appearance of a product, for example, a nightstand lamp, he pauses the playing and traces the contour of the lamp manually using a rectangle. After he confirms the tracing, the lamp contour, the time point of its first appearance, and its location are saved into a database in association with the name and episode number of the television show. Afterwards, the user resumes playing the show until he sees the last time point when the nightstand lamp appears. He pauses the playing again, scrolls back and forth in order to find the exact time point when the product lastly appears, and repeat the contour tracing with a different rectangle. In a similar fashion, information is saved into the same database but with a different time point and location. The user then reviews all the video frames in between the first and the last time points to make sure that no abrupt changes of contour or location occurs for the same lamp. With no abrupt change, a linear interpolation is used to automatically generate the locations and contours for the lamp at all the time points between the first and the last one. All the information including the product name, its graphic icon, time points, locations, contours are saved into the database that is readable and executable by Flash in association with the name and episode number of the television show. The user then repeats the aforementioned product-tracking for each and every product in the show.

What is claimed is:

1. A computer-implemented method for simultaneously viewing a playing multimedia and shopping for a product currently appearing in the playing multimedia comprising:
   a) providing, by a computer, an interface for playing the multimedia;
   b) providing, by the computer, an interface for selecting the product appearing in the playing multimedia during a viewing period to place the product into a shopping cart without stopping or pausing the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart;
   c) providing, by the computer, an interface for accessing the shopping cart at the end of the viewing period; and
   d) providing, by the computer, an interface for purchasing, renting, or saving the product or a similar product or accessing information of the product or the similar product in the shopping cart at the end of the viewing period.

2. The method of claim 1, provided that the multimedia comprises a video or an audio.

3. The method of claim 1, provided that the multimedia is entertainment multimedia.

4. The method of claim 1, provided that the multimedia is a television show or movie.

5. The method of claim 1, provided that the multimedia does not comprise subject matter directed specifically to the product.

6. The method of claim 1, provided that the multimedia does not advertise or market the product.

7. The method of claim 1, provided that the multimedia is played using a media player.

8. The method of claim 7, provided that the media player is Flash, Silverlight, or HTML 5 player.

9. The method of claim 1, provided that the multimedia is played on a computer, a television, or a mobile electronic device.

10. The method of claim 1, provided that the product is a piece of merchandise or a service that currently appears in the multimedia.

11. The method of claim 1, provided that selecting the product comprises using an input device to interact with the product.

12. The method of claim 11, provided that the input device comprises a touchscreen, a mouse, a keyboard, a pointing device, a camera, a microphone, a motion sensor, a temperature sensor, or a pressure sensor.

13. The method of claim 11, provided that the interaction comprises a touch, a click, a tap, highlighting, circling, contouring, a gesture, pointing, swiping, pressing, or crossing.

14. The method of claim 1, provided that selecting the product is achieved by comparing a selection with pre-recorded tracking information.

15. The method of claim 14, provided that the comparison comprises calculating the difference between the selection and a pre-recorded product in their locations, time points, or sizes.

16. The method of claim 14, provided that the comparison comprises choosing a pre-recorded product with a minimal difference to the selection in their locations, time points, or sizes.

17. The method of claim 1, provided that placing the product into the shopping cart comprises placing the exact product or a similar product into the shopping cart.

18. The method of claim 1, provided that the shopping cart comprises an image, a name, a price, a quantity, or a description of the selected product.

19. The method of claim 1, provided that the shopping cart is temporarily visible without substantially obscuring the playing multimedia.

20. The method of claim 1, provided that the shopping cart is visible at the time when the product is added to the shopping cart.

21. The method of claim 1, provided that the shopping cart is visible for less than 10 seconds, less than 9 seconds, less than 8 seconds, less than 7 seconds, less than 6 seconds, less than 5 seconds, less than 4 seconds, less than 3 seconds, less than 2 seconds, or less than 1 second.

22. The method of claim 1, provided that the product being not visually distinguished comprises being not highlighted, not marked, not contoured, not flashing, not glowing, not checked, not crossed out, not tagged, not labeled, or not superimposed with a shape, a color, a sign, a structure, a word, a phrase, or a sentence.

23. The method of claim 1, provided that accessing the shopping cart comprises viewing or editing the shopping cart.

24. The method of claim 1, provided that purchasing comprises placing an order for the product at one or more webpages.

25. The method of claim 1, provided that accessing information of the product comprises connecting to a website of a manufacture, a dealer, a retailer, or obtaining information about physical stores that sells the product.

26. The method of claim 1, provided that a similar product has similarity to the selected product in color, style, shape, manufacturer, composition, function, designer, or brand.

27. Non-transitory computer-readable storage media encoded with a computer program including instructions executable by a processor to create a shopping application for a viewer comprising:
 a) a software module for playing a multimedia;
 b) a software module for selecting the product appearing in the playing multimedia during a viewing period to place the product into a shopping cart without stopping or pausing the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart;
 c) a software module for accessing the shopping cart at the end of the viewing period; and
 d) a software module for purchasing, renting, or saving the product or a similar product or accessing information of the product or the similar product in the shopping cart at the end of the viewing period.

28. A computer-implemented system for simultaneously viewing a playing multimedia and shopping for a product currently appearing in the playing multimedia comprising a processor configured to provide a shopping application for a viewer comprising:
 a) a software module for playing the multimedia;
 b) a software module for selecting the product appearing in the playing multimedia during a viewing period to place the product into a shopping cart without stopping or pausing the playing multimedia, provided that the product is not visually distinguished as selectable in the playing multimedia, the shopping cart appearing temporarily when the product is added without disturbing the playing multimedia, the selection of the product visually indicated by a graphic icon moving into the shopping cart;
 c) a software module for accessing the shopping cart at the end of the viewing period; and
 d) a software module for purchasing, renting, or saving the product or a similar product or accessing information of the product or the similar product in the shopping cart at the end of the viewing period.

\* \* \* \* \*